United States Patent [19]

Bartley

[11] 4,229,127
[45] Oct. 21, 1980

[54] BORING BAR

[75] Inventor: Donald L. Bartley, Willoughby, Ohio

[73] Assignee: Kennametal Inc., Latrobe, Pa.

[21] Appl. No.: 5,431

[22] Filed: Jan. 22, 1979

[51] Int. Cl.³ .................. B23B 47/18; B23B 51/00
[52] U.S. Cl. ................................ 408/158; 10/145; 279/2 R
[58] Field of Search ............... 408/153, 157, 154, 156, 408/158, 161, 168; 10/142, 143, 144, 145; 279/2 R

[56] References Cited
U.S. PATENT DOCUMENTS

| 3,276,101 | 10/1966 | Plein | 408/157 |
| 3,625,625 | 12/1971 | VanRoojen, et al. | 408/158 |

Primary Examiner—Z. R. Bilinsky
Attorney, Agent, or Firm—Lawrence R. Burns

[57] ABSTRACT

A collapsible boring bar is disclosed having radially movable tool units on its outer periphery. The tool units are moved radially by an axially slidable ramp means that acts on cylindrically shaped rollers. The ramp means are located in grooves formed in a tapered spacer element that is located within the head of the boring bar.

3 Claims, 6 Drawing Figures

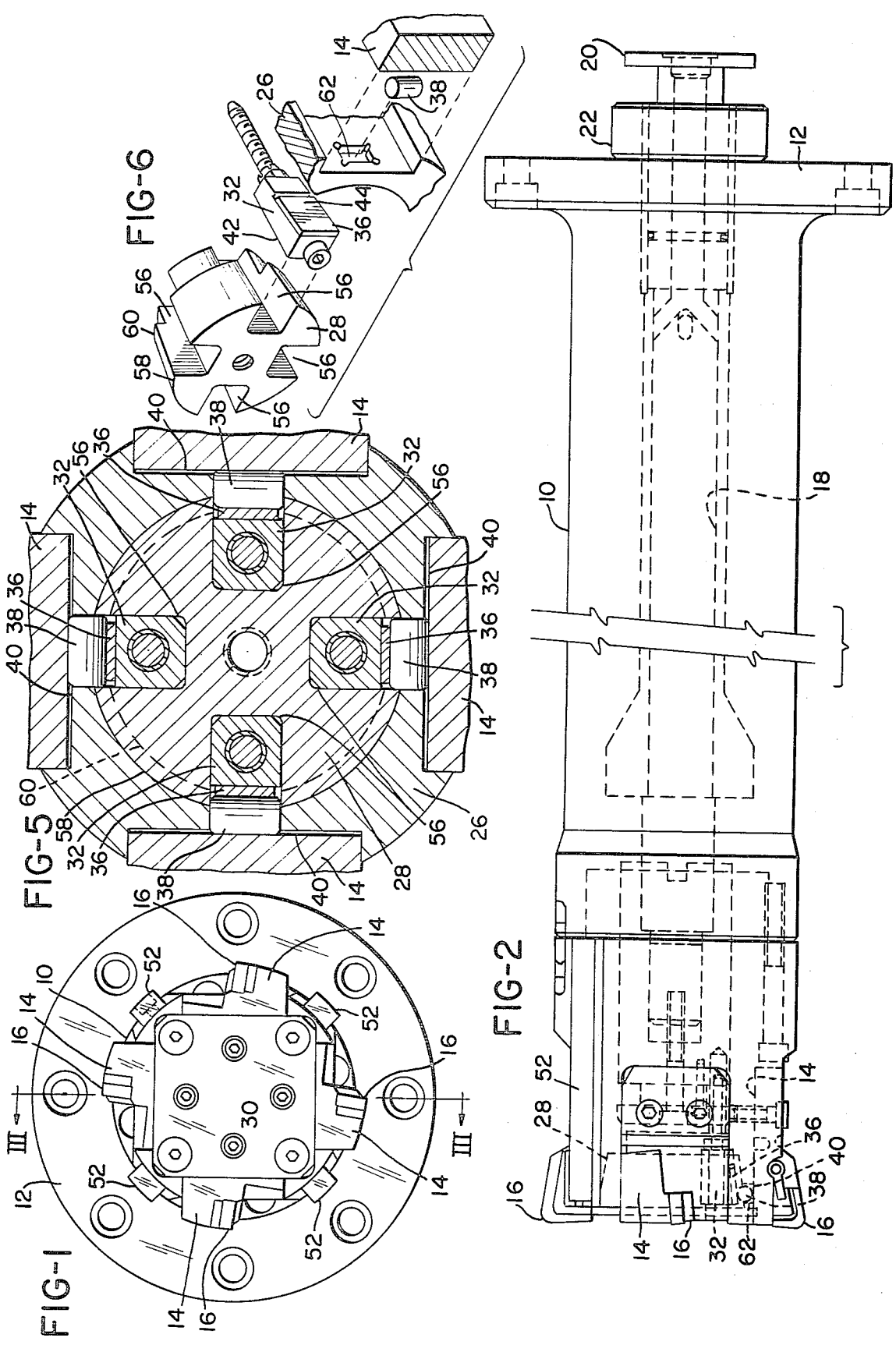

BORING BAR

BACKGROUND OF THE INVENTION

This invention is concerned with boring bars for metalworking. In metalworking, especially when forming internal diameters in workpieces, it is desirable to use what is known as a compensating boring bar. Compensating boring bars have cutting inserts mounted around the periphery of the working end of the bar.

The cutting inserts are seated on tool units that are capable of some radial adjustment relative to the boring bar. The range of radial adjustment need not be great, but should be enough to allow the boring bar to be removed from a finish cut without marking the workpiece. In order to accomplish this adjustment, mechanisms are provided so that the tool units and cutting inserts can be adjusted radially inward so as to provide clearance between the finish bore size and the cutting diameter of the inserts. When this is accomplished, usually after the finish cut has been made, the tool unit can safely be removed from the workpiece.

Previous boring bars with adjustment mechanisms have utilized cone-shaped ramps to adjust the tool units radially and have also used constant diameter plug members in combination with the cone-shaped ramps.

Many problems are encountered when utilizing the previously known boring bars in that the cone-shaped ramps make only a single point contact with the tool units and allow the tool units to shift positions during cutting operations. Further, the constant diameter spacers used previously allowed the various mechanism tolerances of the individual parts of the bar to add up and affect the overall tolerances on the position of the cutting inserts.

Both the shifting of the inserts and the tolerance build-up on the positioning of the inserts are undesirable features when attempting to make very precise finish cuts in workpieces.

The number of tool units on the bar can be one, or more, depending upon one's preference.

BRIEF SUMMARY OF THE INVENTION

According to the present invention, a collapsible boring bar is provided with a drawbar having one end adapted for connection to a reciprocal force transmitting source. The other end of the drawbar is connected to a piston that is telescopically engaged within one end portion of a head member.

The head member has a second and opposing end portion that is telescopically engaged with and abutting a spacer element. Ramp members are preferably formed of blocks that are wedge-like when viewed in side view having two opposing walls converging toward one another. Preferably, a straight base wall has an opposing wall converging toward it. The ramp member, preferably, has a threaded element that passes longitudinally through its center so that it may be connected to the piston.

When assembled, the ramp members are preferably located in grooves formed around the periphery of the spacer element with their threaded elements connected to the piston. Radially movable tool units are located around the periphery of the head and have insert seats and clamps for carrying cutting inserts.

Cylindrical rollers are mounted in perforations in the head that communicate between the tool units and the ramp members. Line contact is established on both sides of the roller between the tool units and the ramp members. The rollers abut both the ramp members and the tool units so that, when said piston is moved by the drawbar, the ramp members will move the tool units in a radial direction on the boring bar.

The spacer element, preferably, has a tapered outside diameter so that, when assembled in the recess formed in the head, the tapered outside diameter will abut with the diameter of the head recess and the spacer will self-center itself in the head.

The exact nature of the present invention will become more clearly apparent upon reference to the following detailed specification, taken in connection with the accompanying drawings, in which:

BRIEF DESCRIPTION OF THE DRAWINGS

FIG. 1 is an end view of the boring bar according to the present invention.

FIG. 2 is a side view of the boring bar according to the present invention.

FIG. 5 is a view taken along line V—V of FIG. 3.

FIG. 6 is an exploded view of the forward assembly of the toolholder.

DETAILED DESCRIPTION OF THE INVENTION

Figure 3:
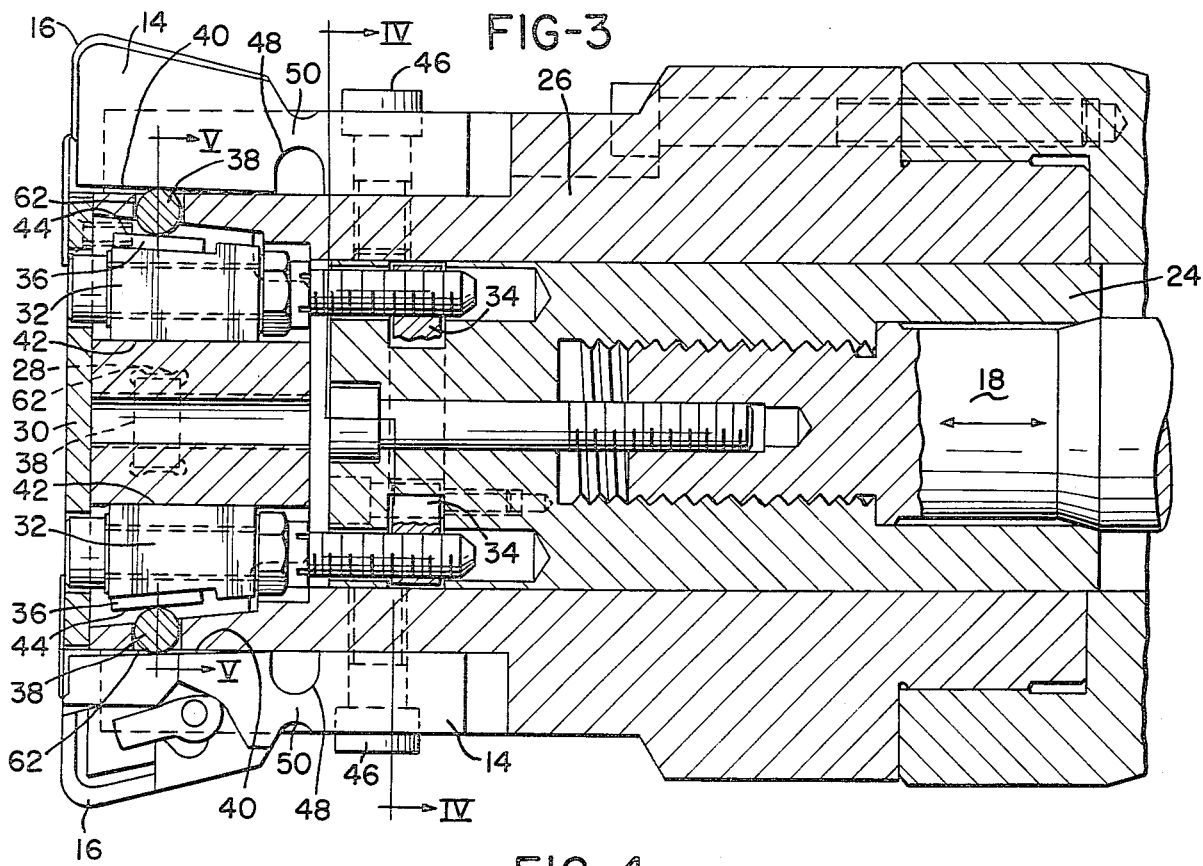
FIG. 3 is a view taken along line III—III of FIG. 1.

Referring to the drawings somewhat more in detail, what is shown in FIG. 1 is a boring bar 10 having a flange 12 for securing it to a machine and having tool units 14 mounted around the periphery of the forward working end of the boring bar 10. The tool units 14 seat and clamp cutting inserts 16.

It is the cutting insert 16 and the tool units 14 that must be necessarily adjusted after making a finish cut in a bore so that the boring bar 10 can be removed from the cut.

Shown further in FIG. 2 is the boring bar 10 having the flange 12 and, further, having a drawbar unit 18 that extends through the length of the boring bar. Drawbar 18 has a flange 20 that is adapted to be hooked to the reciprocal force transmitting mechanism and has a pilot 22 for bar 10.

As will be seen in later drawings, reciprocal movement of the drawbar 18 will move the cutting inserts 16 in a radial direction with respect to the boring bar 10.

Shown in FIG. 3 is the drawbar unit 18 connecting to the piston 24 with the piston 24 telescopically engaged with head 26 of the boring bar 10. A spacer element 28 is shown, also telescopically engaged on the other end, with the head unit 26, and has a cover plate 30 which fits over the spacer unit 28 and holds it in head 26.

The piston member 24 is shown connected to ramp members 32 through linkages 34 provided on the piston 24. Ramp members 32 have pads 36 on an upper face thereof that abut cylindrical roll members 38 which, in turn, abut back wall 40 of the tool units 14.

As can be seen in FIG. 3, when the drawbar 18 is pulled backward into the machine, the piston unit 24 pulls the ramp members 32 rearwardly in the boring bar. Since the ramp members 32 have a flat side 42 that mates with grooves formed in the periphery of the spacer element 28 and a sloping side 44 that mates with the cylindrical rollers 38, the tool units 14 will be forced outwardly into a fully expanded position. When in this position, the finish cut in the bore can be accomplished.

The tool units 14, as can be seen in FIG. 3, are resiliently attached to the head unit 26 by bolts 46. As can be seen, the notched portion 48 along the length of the tool units 14 forms a resilient neck connection 50. When the drawbar unit 18 is pushed forward, sloping ramp members 32 will allow the tool units 14 to return to a contracted position and, thus, allow the bar to be removed from the finish cut.

Figure 4:
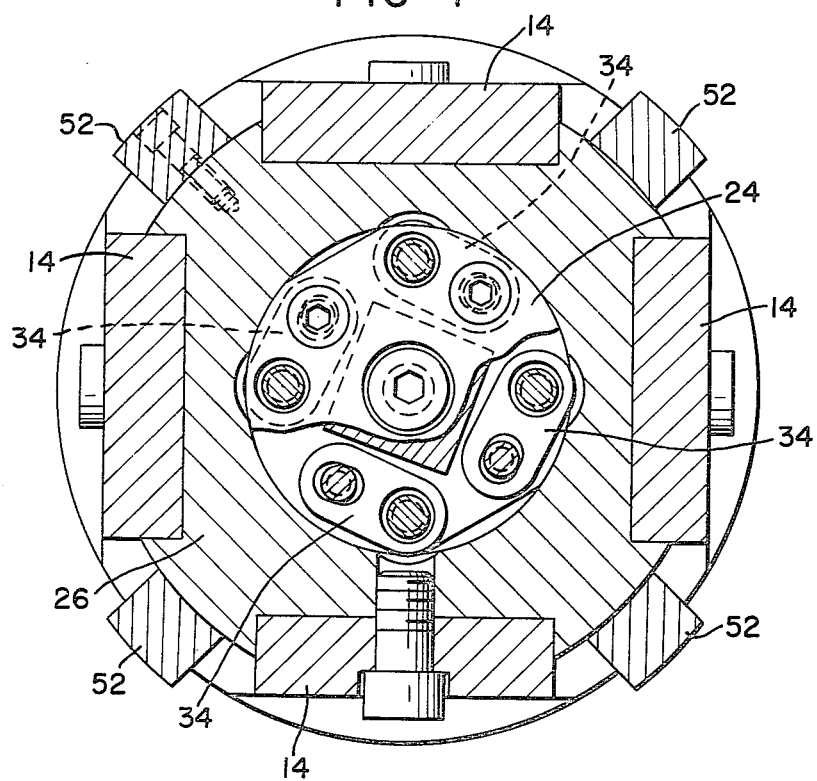
FIG. 4 is a view taken along line IV—IV of FIG. 3.

Referring now to FIG. 4, what is shown therein are wear pads 52 that are bolted to the periphery of the head 26 of the boring bar 10 and extend almost the length thereof so as to provide support in the shank of the boring bar 10. Tool units 14 are shown around the periphery of the boring bar and link members 34 are shown bolted to the top of the piston member 24..

The link members 34 allow the ramp members 32 to be attached to the piston member 24 and, also, allows for any tolerancing difficulties that may occur between the position of the ramp assemblies and the location of the drilled holes on the piston assembly that are necessary to hold the ramp assemblies.

Referring to FIG. 5, what is shown therein are the tool units 14, again surrounding the periphery of the head 26 and the spacer member 28 and ramp members 32 distributed in grooves 56 formed around the periphery of the spacer 28. The cylindrical rollers 38 are shown abutting the pad units 36 on ramp assemblies 32 and also abutting the rear wall 40 of tool units 14.

Also shown in FIG. 5 is that the spacer member 28 is tapered from one end to the other with its largest diameter being shown as at 58 and its smaller diameter being shown by the dotted lines as at 60.

Shown further in FIG. 6 is the tapered spacer 28 having the grooves 56 formed around its periphery and having ramp members 32 located in the grooves 56. The head 26 is shown having a perforation 62 that communicates from the tool unit 14 to the ramp member 32. Thus, the roller, when located in the perforation 62, is held stationary while the ramp member 32 is reciprocally moved along the longitudinal direction of the boring bar, thus, moving the cutting inserts in a radial direction of the boring bar..

Modifications may be made within the scope of the appended claims.

What is claimed is:

1. A collapsible boring bar which comprises: a drawbar; piston means connected to one end of said drawbar; a head with a first end telescopically engaging said piston means; a spacer telescopically engaged with and abutting a second end of said head; ramp means axially slidable on said spacer and rigidly connected to said piston; at least one radially movable tool unit mounted on the periphery of said head; cylindrically shaped roller means located on said head, said roller means being interposed between said ramp means and said individual tool units and abutting with line contacts said individual ramp means and said individual tool unit so that axial movement of said piston moves said tool units in a radial direction.

2. A collapsible boring bar according to claim 1 which further includes a tapered outside diameter on said spacer that tapers inwardly as the spacer extends rearwardly of the boring bar.

3. A collapsible boring bar according to claim 2 which further comprises axial slots formed through the outside diameter of said spacer and spaced around the periphery of said spacer, said individual ramp means being located in said slots.

* * * * *